US009129194B2

(12) United States Patent  
Akahira et al.

(10) Patent No.: US 9,129,194 B2  
(45) Date of Patent: Sep. 8, 2015

(54) IMAGE FORMING SYSTEM, IMAGE FORMING APPARATUS, AND NON-TRANSITORY COMPUTER READABLE MEDIUM

(71) Applicant: FUJI XEROX CO., LTD., Minato-ku, Tokyo (JP)

(72) Inventors: Shinji Akahira, Kanagawa (JP); Kazuya Kawabata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 275 days.

(21) Appl. No.: 13/665,361

(22) Filed: Oct. 31, 2012

(65) Prior Publication Data

US 2013/0342867 A1    Dec. 26, 2013

(30) Foreign Application Priority Data

Jun. 20, 2012   (JP) ................. 2012-138875

(51) Int. Cl.
| | | |
|---|---|---|
| G06K 15/00 | (2006.01) | |
| G06K 15/02 | (2006.01) | |
| G03G 15/00 | (2006.01) | |
| G06F 3/12 | (2006.01) | |

(52) U.S. Cl.
CPC .............. *G06K 15/02* (2013.01); *G03G 15/502* (2013.01); *G03G 15/553* (2013.01); *G06F 3/1218* (2013.01); *G06F 3/1258* (2013.01); *G06F 3/1262* (2013.01); *G06F 3/1286* (2013.01); *G06K 15/005* (2013.01); *G06K 15/1822* (2013.01); *G03G 2215/00109* (2013.01)

(58) Field of Classification Search
USPC ................................. 358/1.13–1.16
See application file for complete search history.

(56) References Cited

U.S. PATENT DOCUMENTS

| | | | |
|---|---|---|---|
| 2005/0275868 A1 | 12/2005 | Higashiura et al. | |
| 2007/0247654 A1* | 10/2007 | Tian ............................ | 358/1.14 |
| 2009/0257078 A1* | 10/2009 | Sawada et al. ............... | 358/1.14 |
| 2010/0253968 A1* | 10/2010 | Nuggehalli .................. | 358/1.15 |

FOREIGN PATENT DOCUMENTS

| | | |
|---|---|---|
| JP | 2001-186691 A | 7/2001 |
| JP | 2004-098505 A | 4/2004 |
| JP | 2005-349704 A | 12/2005 |

* cited by examiner

*Primary Examiner* — Marivelisse Santiago Cordero  
*Assistant Examiner* — Kent Yip  
(74) *Attorney, Agent, or Firm* — Sughrue Mion, PLLC

(57) ABSTRACT

An image forming apparatus includes a first retrieval unit that retrieves a table of document data, an image forming unit that forms an image on a recording medium in accordance with the document data, a second retrieval unit that retrieves a cumulative amount of images formed by the image forming unit, a third retrieval unit that retrieves a threshold value of the cumulative amount of images formed by the image forming unit, and a display unit that displays a selection screen that allows a user to select document data forming an image from the document data included in the table. If the cumulative amount does not exceed the threshold value, the display unit displays a screen including a batch selection screen. If the cumulative amount exceeds the threshold value, the display unit displays an individual selection screen.

21 Claims, 13 Drawing Sheets

| RECEPTION NO. | FILE NAME | PAGE COUNT | TIME AND DATE OF COMMAND |
|---|---|---|---|
| 1 | NEW BUSINESS IN REGION V | 50 | XX/25/20XX 18:50 |
| 2 | MATERIAL FOR MEETING OF COMPANY Z | 10 | XX/25/20XX 19:00 |
| 3 | BUSINESS ACTIVITY ANALYSIS OF COMPANY U | 25 | XX/25/20XX 21:10 |
| 4 | PRESENTATION MATERIAL OF TEAM W | 50 | XX/26/20XX 10:45 |
| 5 | MONTHLY SALES OF COMPANY Y | 20 | XX/26/20XX 11:20 |
| 6 | TECHNICAL TREND OF COMPANY X | 30 | XX/26/20XX 11:25 |

IMAGE FORMING SYSTEM, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-138875 filed Jun. 20, 2012.

BACKGROUND (i) Technical Field

The present invention relates to an image forming system, an image forming apparatus, an image forming method, and a non-transitory computer readable medium.

(ii) Related Art

A technique of managing the print count of recording media is used in an image forming apparatus. The technique sets an upper limit value on the print count of the recording media to reduce print costs.

SUMMARY

According to an aspect of the invention, an image forming apparatus is provided. The image forming apparatus includes a first retrieval unit that retrieves a table of document data, an image forming unit that forms an image on a recording medium in accordance with the document data, a second retrieval unit that retrieves a cumulative amount of images formed by the image forming unit, a third retrieval unit that retrieves a threshold value of the cumulative amount of images to be formed by the image forming unit, and a display unit that displays a selection screen that allows a user to select document data forming an image from the document data included in the table. If the cumulative amount does not exceed the threshold value when the image forming unit forms images in accordance with the document data included in the table, the display that displays a screen including a batch selection screen that allows the document data included in the table to be selected in a batch. If the cumulative amount exceeds the threshold value when the image forming unit forms the images in accordance with the document data included in the table, the display unit displays an individual selection screen that allows the document data included in the table to be selected individually.

BRIEF DESCRIPTION OF THE DRAWINGS

Exemplary embodiments of the present invention will be described in detail based on the following figures, wherein.

DETAILED DESCRIPTION

Figure 1:
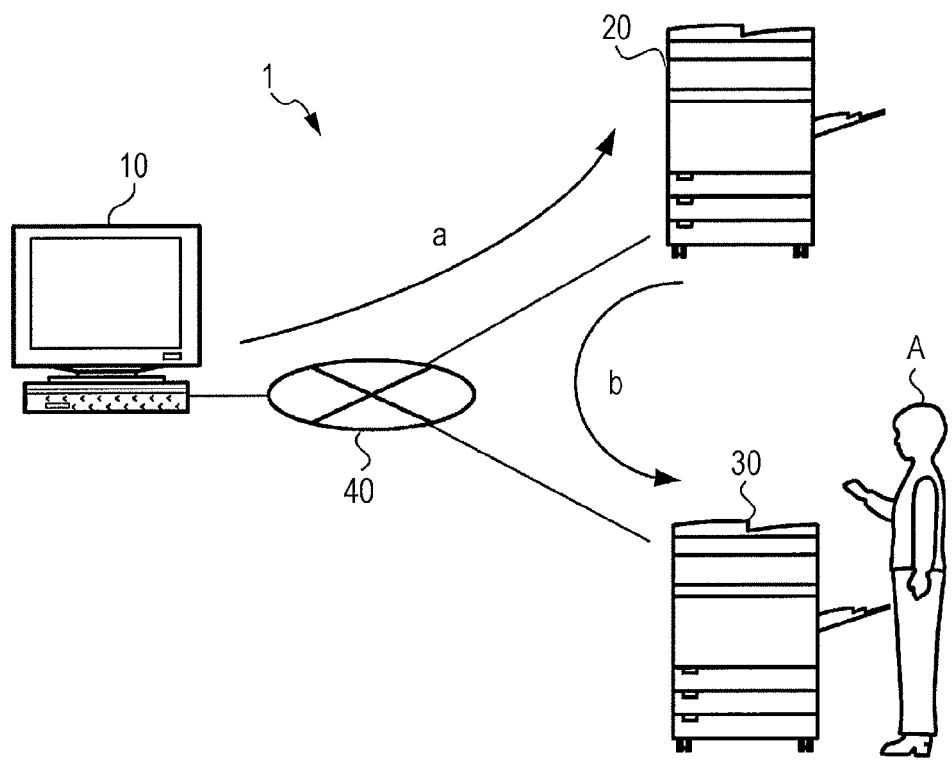
FIG. 1 illustrates an entire configuration of an image forming system of an exemplary embodiment of the present invention.

FIG. 1 illustrates a configuration of an entire image forming system 1 in accordance with an exemplary embodiment of the present invention. The image forming system 1 forms an image on a paper sheet (an example of recording medium) in accordance with document data selected by a user. The document data refer to data that serve as a base of an image to be formed on the paper sheet. The image forming system 1 includes terminal apparatus 10, image forming apparatus 20 (an example of a first image forming apparatus), and image forming apparatus 30 (an example of a second image forming apparatus). The terminal apparatus 10 is an information terminal such as a personal computer. The image forming apparatus 20 and the image forming apparatus 30 are apparatuses that function as a copying machine, a printer, a scanner, and/or a facsimile machine. The terminal apparatus 10, the image forming apparatus 20, and the image forming apparatus 30 are connected to each other via an internal communication line 40. The internal communication line 40 is a wired or a wireless local area network (LAN). The terminal apparatus 10 transmits the document data to the image forming apparatus 20 (an arrow a). The image forming apparatus 20 stores the document data retrieved from the terminal apparatus 10. In response to a request from the image forming apparatus 30, the image forming apparatus 20 transfers the document data to the image forming apparatus (an arrow b). The image forming apparatus 30 requests the image forming apparatus 20 to transmit the document data, and forms an image on a paper sheet in accordance with the document data retrieved from the image forming apparatus 20. In the following discussion, the word "outputting" refers to the forming of an image on the paper sheet in accordance with the document data. In the image forming system 1, a user A transmits the document data from the terminal apparatus 10 to the image forming apparatus 20. The user A then logs in to the image forming apparatus 30, selects a single piece out of plural pieces of document data from the document data stored on the image forming apparatus 20, and then outputs (forms) an image. Like the image forming apparatus 20, an image forming apparatus that transmits the document data stored thereon in response to a request from another image forming apparatus is referred to as a "master apparatus." Like the image forming apparatus 30, an image forming apparatus that outputs an image in response to the document data retrieved from the "master apparatus" is referred to as a "dependent apparatus." Whether an image forming apparatus functions as a master apparatus or a dependent apparatus is set beforehand. Even if the master apparatus is used by another user in the image forming system 1, the user A may output an image using the dependent apparatus.

Figure 2:
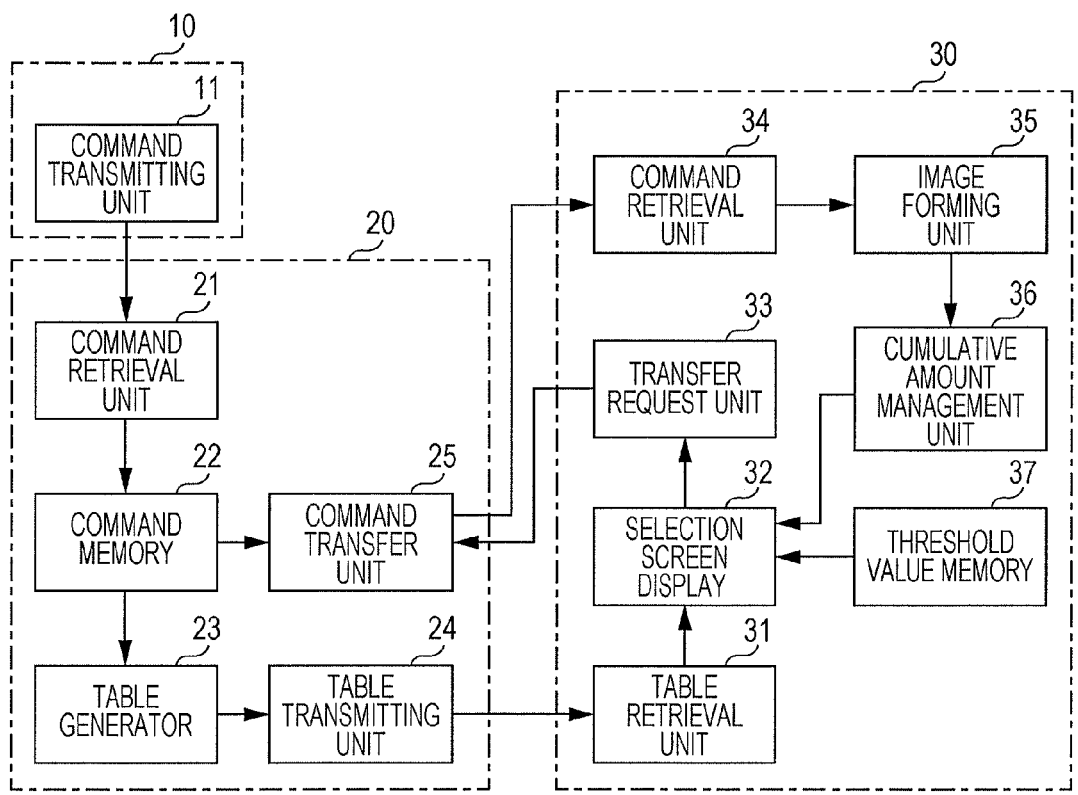
FIG. 2 is a functional block diagram illustrating the image forming system.

FIG. 2 is a function block diagram illustrating the image forming system 1. The terminal apparatus 10 includes a command transmitting unit 11. The command transmitting unit 11 transmits to the image forming apparatus 20 an output command to output the document data. The output command includes the document data and transmission time and date (hereinafter referred to as command time and date) of the document data. The output command also includes a variety of parameters related to image forming conditions, such as an output range, magnification, presence or absence of a duplex printing output, output print count, and presence or absence of color printing.

The image forming apparatus 20 includes command retrieval unit 21, command memory 22, table generator 23, table transmitting unit 24, and command transfer unit 25. The command retrieval unit 21 stores the output command retrieved by the command retrieval unit 21. The command memory 22 stores the output command retrieved by the command retrieval unit 21. The table generator 23 generates a table of the document data included in the output command. The table of the document data is generated for each individual user. The table transmitting unit 24 (an example of a table transmitting unit) transmits the table of the document data generated by the table generator 23 to the image forming apparatus 30. In response to a transfer request from the image forming apparatus 30, the command transfer unit 25 reads the output command from the command memory 22 and then transmits the output command to the image forming apparatus 30.

The image forming apparatus 30 includes table retrieval unit 31, selection screen display 32, transfer request unit 33, command retrieval unit 34, image forming unit 35, cumulative amount management unit 36, and threshold value memory 37. The table retrieval unit 31 (an example of a first retrieval unit) retrieves the table of the document data from the image forming apparatus 20. The selection screen display 32 (an example of a display unit) displays a selection screen. The selection screen is used to cause a user to select document data to be output from among the document data included in the table. The transfer request unit 33 requests the image forming apparatus 20 to transfer the output command including the document data selected on the selection screen display 32. The command retrieval unit 34 retrieves the output command transferred from the image forming apparatus 20. The image forming unit 35 (an example of an image forming unit) outputs the image in response to the output command retrieved by the command retriever 34. The cumulative amount management unit 36 (an example of a second retrieval unit) manages a cumulative amount of images output by the image forming unit 35. The cumulative amount is initialized at timing responsive to a predetermined event. The predetermined event refers to an operation that an administrator of the image forming system 1 performs to initialize the cumulative amount, or time when it is predetermined time and date. The threshold value memory 37 (an example of a third retrieval unit) stores a threshold value of the cumulative amount of images to be output by the image forming unit 35.

If the cumulative amount does not exceed the threshold value when the image forming unit 35 forms images in response to the document data included in the table, the selection screen display 32 displays a screen including a batch selection screen. The selection screen display 32 displays an individual selection screen if the cumulative amount exceeds the threshold value when the image forming unit 35 forms images in response to the document data included in the table.

Figure 3:
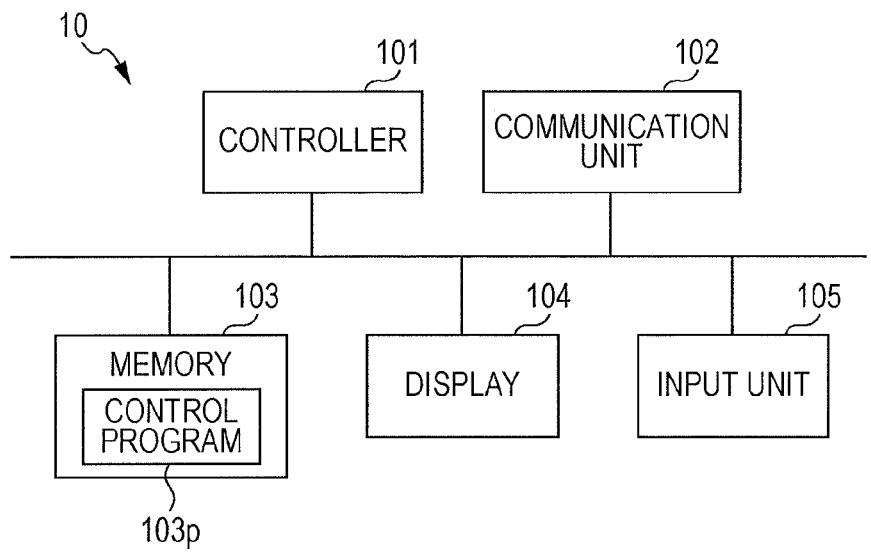
FIG. 3 is a block diagram illustrating a hardware configuration of a terminal apparatus.

FIG. 3 is a block diagram illustrating a hardware configuration of the terminal apparatus 10. The terminal apparatus 10 is a computer including controller 101, communication unit 102, memory 103, display 104, and input unit 105. The controller 101 controls operation of each element of the terminal apparatus 10. The controller 101 includes a central processing unit (CPU), a read-only memory (ROM), and a random-access memory (RAM). The communication unit 102 performs a communication operation via the internal communication line 40. The memory 103 is a memory device, such as a hard disk drive (HDD), and stores data and programs. For example, the memory 103 stores data and a control program 103p, used by the controller 101. The control program 103p causes the terminal apparatus 10 to function as an information terminal. The display 104 is a display device such as a liquid-crystal display or an organic electroluminescence display. The input unit 105 receives an input from a user, and includes a key pad (keyboard) and a variety of buttons. The communication unit 102 controlled by the controller 101 that executes the control program 103p is an example of the command transmitting unit 11.

Figure 4:
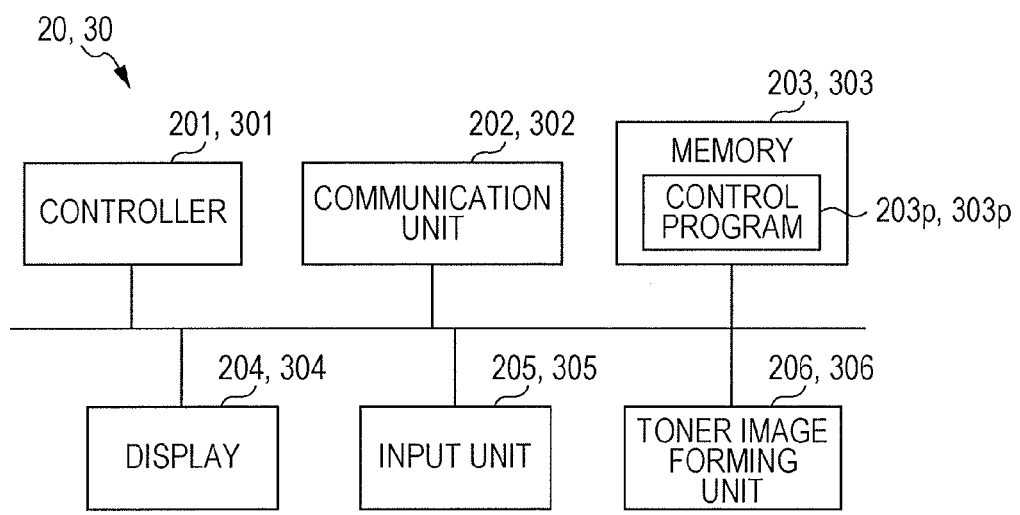
FIG. 4 is a block diagram illustrating a hardware configuration of an image forming apparatus.

FIG. 4 is a block diagram illustrating a hardware configuration of each of the image forming apparatus 20 and the image forming apparatus 30. The image forming apparatus 20 is a computer that includes controller 201, communication unit 202, memory 203, display 204, input unit 205, and toner image forming unit 206. The controller 201 controls operation of each element of the image forming apparatus 20. The controller 201 includes a CPU, a ROM, and a RAM. The communication unit 202 performs a communication operation via the internal communication line 40. The memory 203 is a memory device that stores data and a program. The memory 203 is a hard disk device, for example, and stores data and programs. For example, the memory 203 stores data and a control program 203p, used by the controller 201. The control program 203p causes the image forming apparatus 20 to function as a master apparatus. The display 204 includes a display unit such as a liquid-crystal display or an organic electroluminescence display. The display 204 displays a menu screen or a variety of messages to operate the image forming apparatus 20. The display 204 includes a touch screen (touchpanel) overlaid on a display. The input unit 205 includes a variety of keys to input data or a command to the image forming apparatus 20. The display 204 and the input unit 205 operate as a user interface with which the user operates the image forming apparatus 20. By operating the display 204 and the input unit 205, a variety of commands and a variety of settings are performed on the image forming apparatus 20. The toner image forming unit 206 forms a toner image on a paper sheet.

The controller 201 in the image forming apparatus 20 is an example of the table generator 23. The communication unit 202 controlled by the controller 201 that executes the control program 203p is an example of each of the command retrieval unit 21, the table transmitting unit 24, and the command transfer unit 25. The memory 203 controlled by the controller 201 that executes the control program 203p is an example of the command memory 22.

The image forming apparatus 30 is a computer that includes controller 301, communication unit 302, memory 303, display 304, input unit 305, and toner image forming unit 306. The memory 303 stores data and a control program 303p, used by the controller 301. The control program 303*p* causes the image forming apparatus 30 to operate as a dependent apparatus. The communication unit 302 controlled by the controller 301 that executes the control program 303*p* is an example of each of the table retrieval unit 31, the transfer request unit 33, and the command retrieval unit 34. The memory 303 controlled by the controller 301 that executes the control program 303*p* is an example of each of the cumulative amount management unit 36 and the threshold value memory 37. The display 304 controlled by the controller 301 that executes the control program 303*p* is an example of the selection screen display 32. The toner image forming unit 306 controlled by the controller 301 that executes the control program 303*p* is an example of the image forming unit 35.

Figure 5:
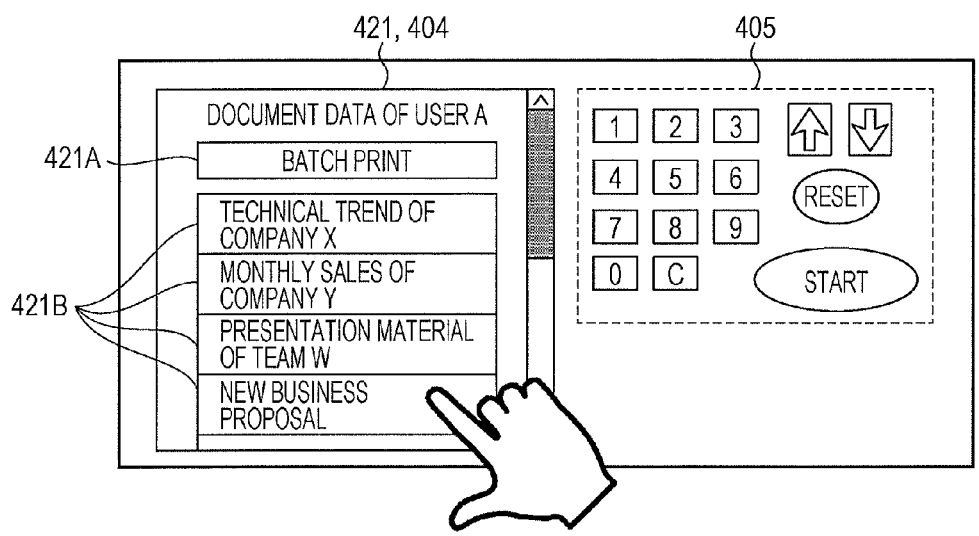
FIG. 5 illustrates a selection screen of a display of a dependent apparatus in accordance with an example of the exemplary embodiment.

FIG. 5 illustrates a selection screen 421 displayed by a display 404 of a dependent apparatus in accordance with an example of the exemplary embodiment. The selection screen 421 is displayed when the user logs in to the dependent apparatus and selects a mode to execute an output command stored on the dependent apparatus. Log-in is performed, for example, when the user operates one of the display 404 and input unit 405 to enter a user ID and a password. In another example, the log-in may be performed when the dependent apparatus reads an IC card having the user ID recorded thereon. The dependent apparatus retrieves from the master apparatus the table of the document data of the user who has logged in, and displays the selection screen 421 in accordance with the table. The selection screen 421 includes a batch print button 421A and individual selection buttons 421B. The batch print button 421A allows the document data included in the table to be selected in a batch. The individual selection buttons 421B allow the document data included in the table to be selected individually, and include one button or plural buttons. Pressing one of the batch print button 421A and the individual selection buttons 421B, the user selects the document data to be output. The outputting of the document data is performed when the user selects the document data and presses a start button.

Figure 6:
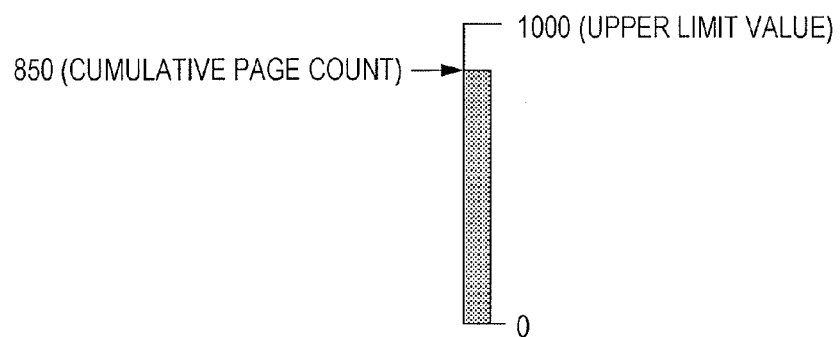
FIG. 6 illustrates a cumulative amount of recording paper output from an image forming system in accordance with an example of the exemplary embodiment.

FIG. 6 illustrates a cumulative amount of paper sheets output from the image forming system in accordance with an example of the exemplary embodiment. The cumulative amount is the cumulative number of output pages (also referred to as a cumulative page count). The page count refers to the number of pages of paper sheets. If the outputting is performed on both sides of a paper sheet, the page count is two. If the outputting is performed on one side of a paper sheet, the page count is one. An upper limit value is set on the cumulative page count in the example. The master apparatus and the dependent apparatus are subject to the upper limit value of the page count. The upper limit value is set by the administrator of the image forming system. The cumulative page count and the upper limit value may be managed on a per user basis or on a per group basis. As illustrated in FIG. 6, the cumulative page count is 850 pages, and the upper limit value is 1000 pages. The remaining page count that can be output (hereinafter referred to as a permissible page count) is 150 pages. If the document data having a page count in excess of the permissible page count are selected on the selection screen 421, one of the following operations is performed:

(1) The outputting of the selected document data is suspended at the moment the cumulative page count reaches the upper limit value.

(2) The outputting of all the selected document data is suspended.

The image forming system 1 then performs the following process.

Figure 7:
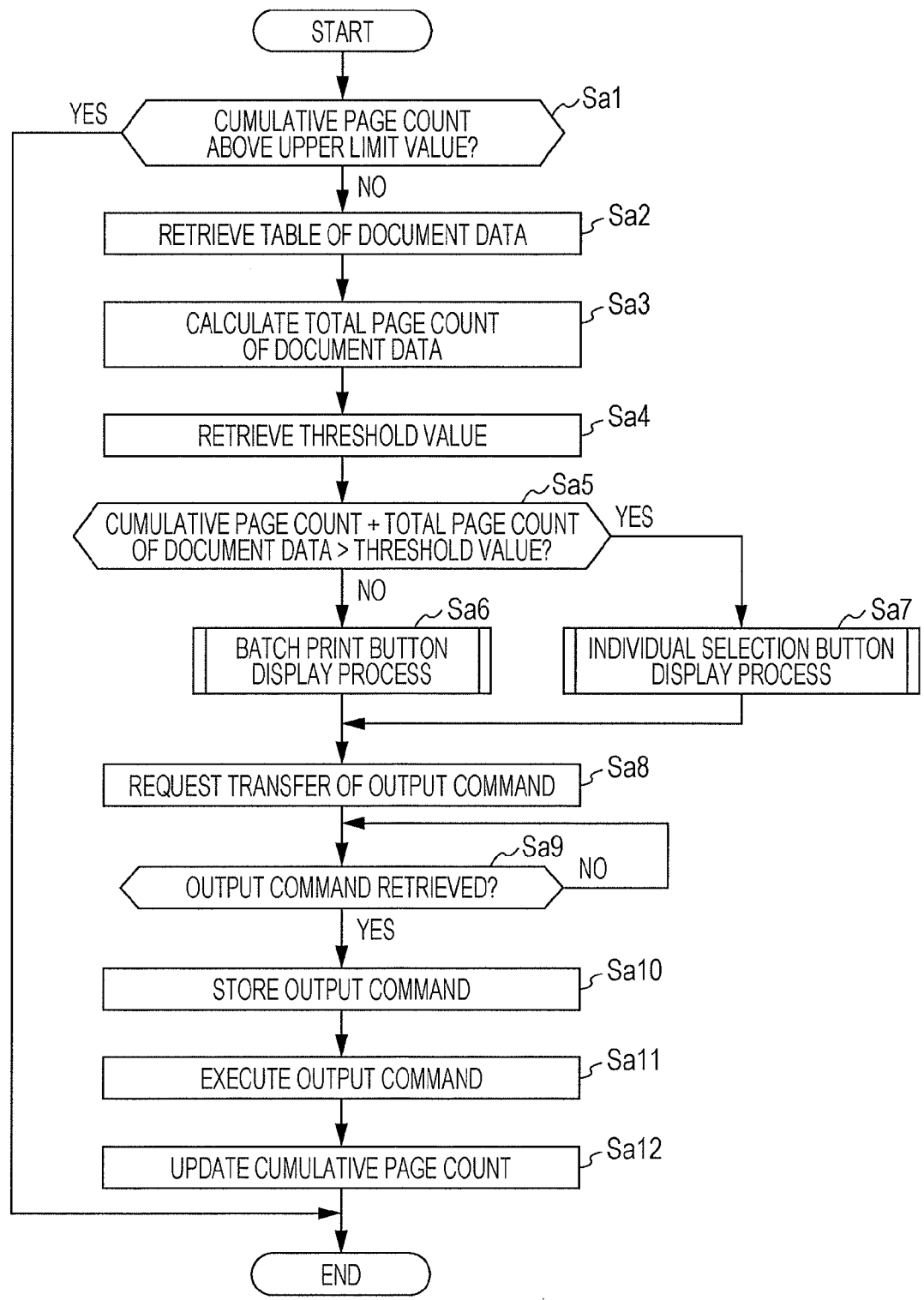
FIG. 7 is a flowchart illustrating a process of the image forming apparatus of the exemplary embodiment.

FIG. 7 is a flowchart illustrating a process of the image forming apparatus 30 of the exemplary embodiment of the present invention. In a pre-process prior to the process of FIG. 7, the user A transmits the output command from the terminal apparatus 10 to the image forming apparatus 20. The controller 201 stores the output command retrieved from the terminal apparatus 10 onto the memory 203. In response to the output command stored on the memory 203, the controller 201 generates a table of the document data of the user A, and then stores the table of the document data on the memory 203. The process of FIG. 7 is triggered when the user A logs in to the image forming apparatus 30 and selects the mode to execute the output command stored on the image forming apparatus 20. The following discussion is based on the premise that the cumulative page count, the upper limit value, and the output command are managed on a per user basis.

In step Sa1, the controller 301 determines whether the cumulative page count of the user A is above the upper limit value set on the user A. The controller 301 reads from the cumulative page counts and the upper limit values stored on the memory 303 the cumulative page count and the upper limit value of the user A, and then compares the cumulative page count and the upper limit value of the user A. If the controller 301 determines that the cumulative page count is above the upper limit value (yes from step Sa1), the controller 301 ends the process. In this way, the outputting of the document data of the page count above the upper limit value is controlled. If the controller 301 determines that the cumulative page count is not above the upper limit value (no from step Sa1), the controller 301 proceeds to step Sa2. In step Sa2, the controller 301 retrieves the table of the document data of the user A from the image forming apparatus 20. The controller 301 then stores the table of the retrieved document data on the RAM.

Figures 8, 9:
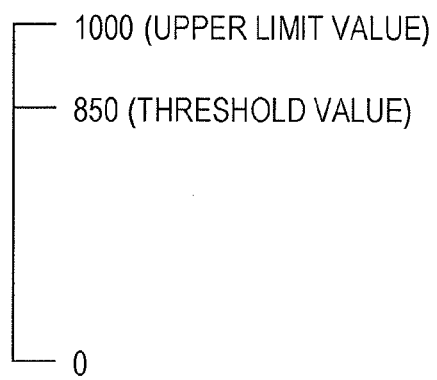
FIG. 8 illustrates an example of a table of document data.
FIG. 9 illustrates an example of a threshold value.

FIG. 8 illustrates an example of the table of the document data. The table of the document data includes information of a reception number, a file name, a page count, and command time and date. The reception number identifies the retrieval of the output command from the terminal apparatus 10. The file name is a file name of the document data stored on the image forming apparatus 20. The page count represents a page count of the document data.

Referring back to FIG. 7, in step Sa3, the controller 301 calculates the total page count of the document data included in the table. The total page count refers to a total page count of the document data included in the table of a given user. More specifically, the total page count is the total count of all the document data included in the output command that the user has transmitted from the terminal apparatus 10. As illustrated in FIG. 8, the total page count of the user A is 140. The controller 301 stores the calculated total page count on the RAM. In step Sa4, the controller 301 retrieves a threshold value. The threshold value is related to the cumulative page count, and serves as a criterion according to which a batch print button display process or an individual selection print button display process discussed below is performed. The threshold value is set in view of the upper limit value by the administrator of the image forming system 1. In the exemplary embodiment, the threshold value is stored on the memory 303 on a per user basis. The controller 301 then reads the threshold value of the user A from the memory 303.

FIG. 9 illustrates a threshold value. The threshold value is set to be equal to or lower than the upper limit value. In this example, the upper limit value is 1000 pages, and the threshold value is 850 pages.

Referring back to FIG. 7, in step Sa5, the controller 301 determines whether the sum of the cumulative page count of the user A and the total page count of the document data is higher than the threshold value. The controller 301 performs the determination operation by reading the cumulative page count and the total page count of the document data from the memory 303 and the RAM. If the controller 301 determines that the sum of the cumulative page count of the user A and the total page count of the document data is equal to or lower than the threshold value (no from step Sa5), the controller 301 proceeds to step Sa6. If the controller 301 determines that the sum of the cumulative page count of the user A and the total page count of the document data is higher than the threshold value (yes from step Sa5), the controller 301 proceeds to step Sa1.

In step Sa6, the controller 301 performs a batch print button display process. Subsequent to the batch print button display process, batch printing or individual printing is performed. The batch printing is triggered when the user presses a batch print button. In the batch printing, all the document data included in the table are output in a batch with no particular individual piece of the document data selected. In the individual printing, the user selects individually the document data, and a single selected piece or plural selected pieces of the document data are output at a time. If one piece of the document data is selected in the individual printing, the selected piece of document data is output. In step Sa1, the controller 301 performs an individual selection button display process. Subsequent to the individual selection button display process, the individual printing is performed. In the individual selection button display process, a piece of document data subject to the upper limit value imposed on the output thereof is displayed in a different manner from the remaining pieces of document data that are not subject to the upper limit value. In step Sa6 or step Sa1, the user A selects document data to be output from the document data included in the table.

Figure 10:
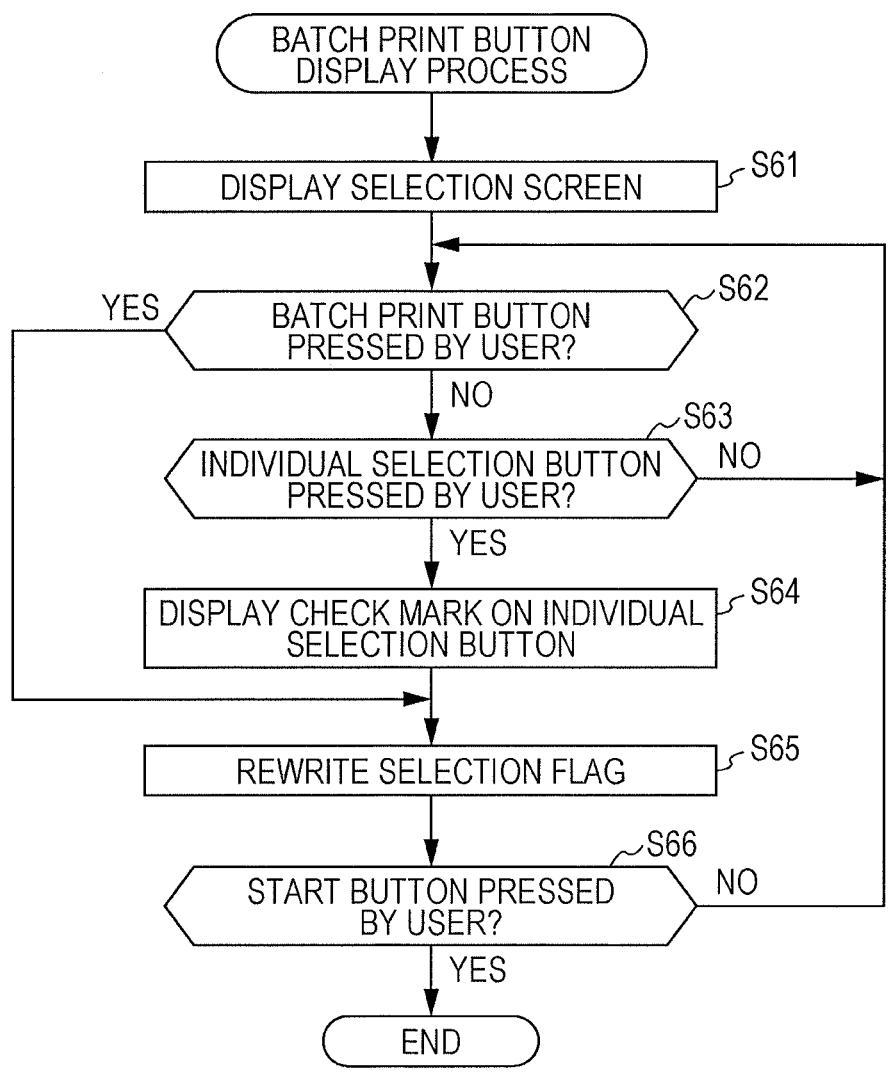
FIG. 10 is a flowchart illustrating a batch print button display process.

FIG. 10 is a flowchart illustrating the batch print button display process in step Sa6. In step S61, the controller 301 displays a selection screen. The controller 301 displays the selection screen on the display 304 in accordance with the table of the document data of the user A.

Figure 11A:
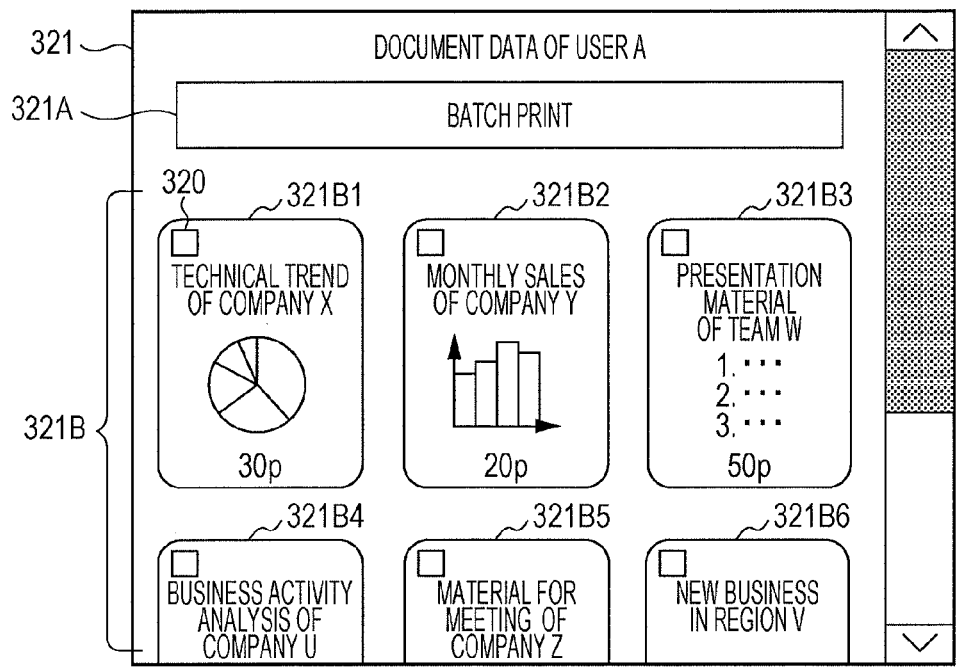
FIGS. 11A through 11C illustrate examples of a selection screen displayed in the batch print button display process.
Figure 11B:
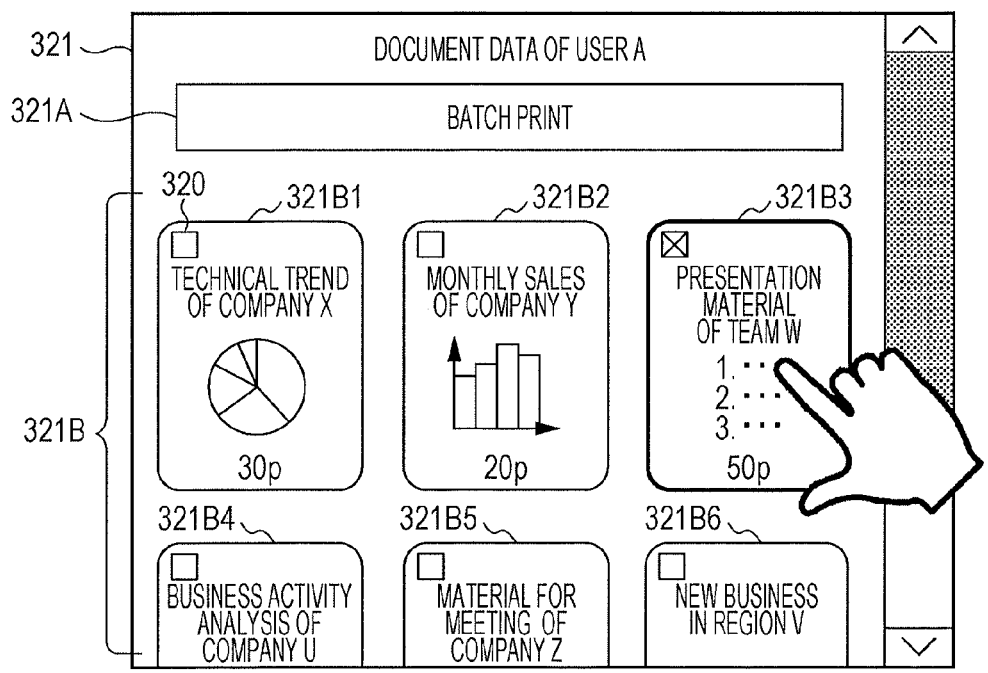

FIGS. 11A and 11B illustrate an example of a selection screen 321 displayed in the batch print button display process. The selection screen 321 includes a batch print button 321A (an example of a batch selection screen), and an individual selection button 321B (an example of an individual selection screen). The batch print button 321A is used to select the document data included in the table to be selected in a batch. The individual selection button 321B is used to select the document data included in the table to be individually selected. The individual selection button 321B is a thumbnail of the document data, and for example, includes a contracted image of an image of the document data (such as an image of a leading page of the document data), a file name of the document data, and a page count of the document data. The individual selection button 321B includes a check box 320 to indicate that the individual selection button 321B is selected by the user. The individual selection buttons 321B1 through 321B6 indicate individual pieces of the document data. The individual selection buttons 321B are arranged with respect to the command time and date. More specifically, the individual selection button 321B of the document data at a later command time and date is displayed with a higher priority than an individual selection button 321B of the document data at an earlier command time and date. By pressing the batch print button 321A or the individual selection button 321B, the user A specifies the document data to be output.

Referring back to FIG. 10, the controller 301 determines in step S62 whether the user A has pressed the batch print button 321A. If the controller 301 determines that the user A has pressed the batch print button 321A (yes from step S62), the controller 301 proceeds to step S65. If the controller 301 determines that the user A has not pressed the batch print button 321A (no from step S62), the controller 301 proceeds to step S63.

The controller 301 determines in step S63 whether the user A has pressed the individual selection button 321B. If the controller 301 determines that the user A has pressed the individual selection button 321B (yes from S63), the controller 301 proceeds to step S64. If the controller 301 determines that the user A has not pressed the individual selection button 321B (no from S63), the controller 301 returns to step S62 and then waits on standby until the batch print button 321A or the individual selection button 321B has been pressed. In step S64, the controller 301 displays a check mark on the check box 320 of the individual selection button 321B pressed by the user A.

Figure 11C:
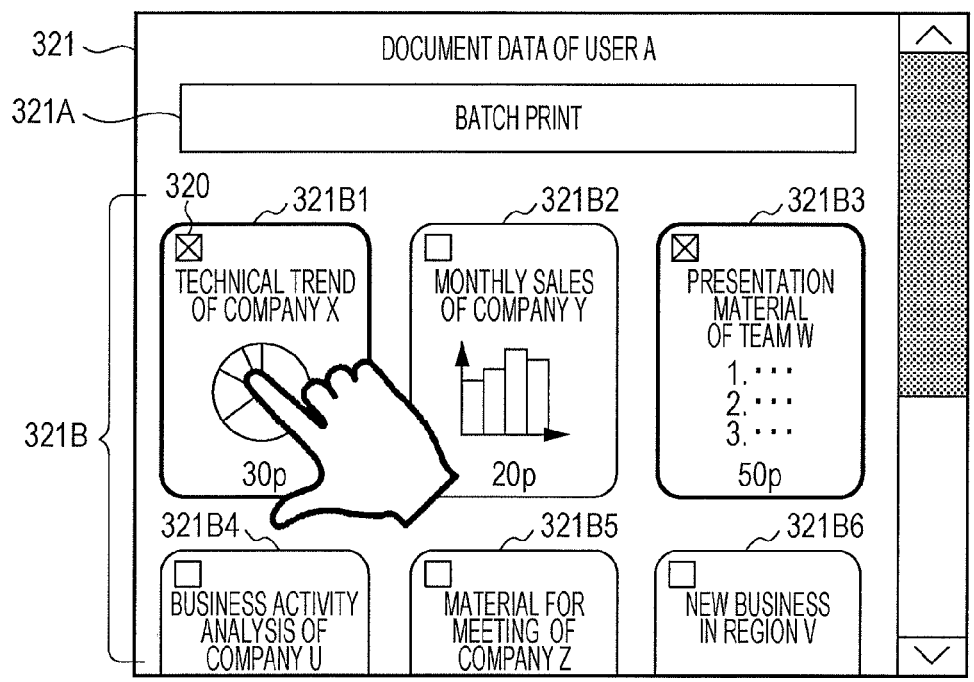

FIG. 11B illustrates the selection screen 321 in which the user A has pressed an individual selection button 321B3. By pressing the individual selection button 321B3, the user A has selected the document data having a file name "PRESENTATION MATERIAL OF TEAM W" (hereinafter simply referred to as "file name"). A check mark is displayed on the check box 320 of the individual selection button 321B3 pressed by the user A, and the outline of the individual selection button 321B3 is bolded. The individual selection button 321B3 is thus displayed in a different manner from the remaining individual selection buttons 321B1, 321B2, 321B4, 321B5, and 321B6, all not pressed by the user A. As illustrated in FIG. 11C, the user A may select plural pieces of the document data to be output by pressing plural individual selection buttons 321B. As illustrated in FIG. 11C, the user A has selected "TECHNICAL TREND OF COMPANY X" in addition to "PRESENTATION MATERIAL OF TEAM W." The user A may cancel the selection by the individual selection button 321B again. In such a case, the check mark and the bolded outline are hidden. For example, in FIG. 11B, the user A may press the individual selection button 321B3 again. The selection screen 321 returns to the state of FIG. 11A, and the check mark and the bold outline of the individual selection button 321B3 are hidden.

In step S65, the controller 301 rewrites a selection flag. The selection flag is used to discriminate the document data selected by the user from unselected document data. The number of selection flags corresponds to the number of pieces of document data included in the table on the RAM. The initial value of the selection flag is "0." In step S65, the controller 301 rewrites the value of the selection flag corresponding to the document data selected by the user with the value "1." In the selection flag, "1" indicates that the corresponding document data have been selected by the user, and "0" indicates that the corresponding document data have not been selected by the user. If the batch print button is pressed in step S62, the controller 301 rewrites the values of the selection flags of all the document data with "1." The controller 301 determines in step S66 whether the user has pressed the start button (not illustrated) of the input unit 305. If the controller 301 determines that the user has pressed the start button (not illustrated) of the input unit 305 (yes from step S66), the controller 301 completes the process. If the controller 301 determines that the user has pressed the start button of the input unit 305 (no from step S66), the controller 301 returns to step S62.

Figure 12:
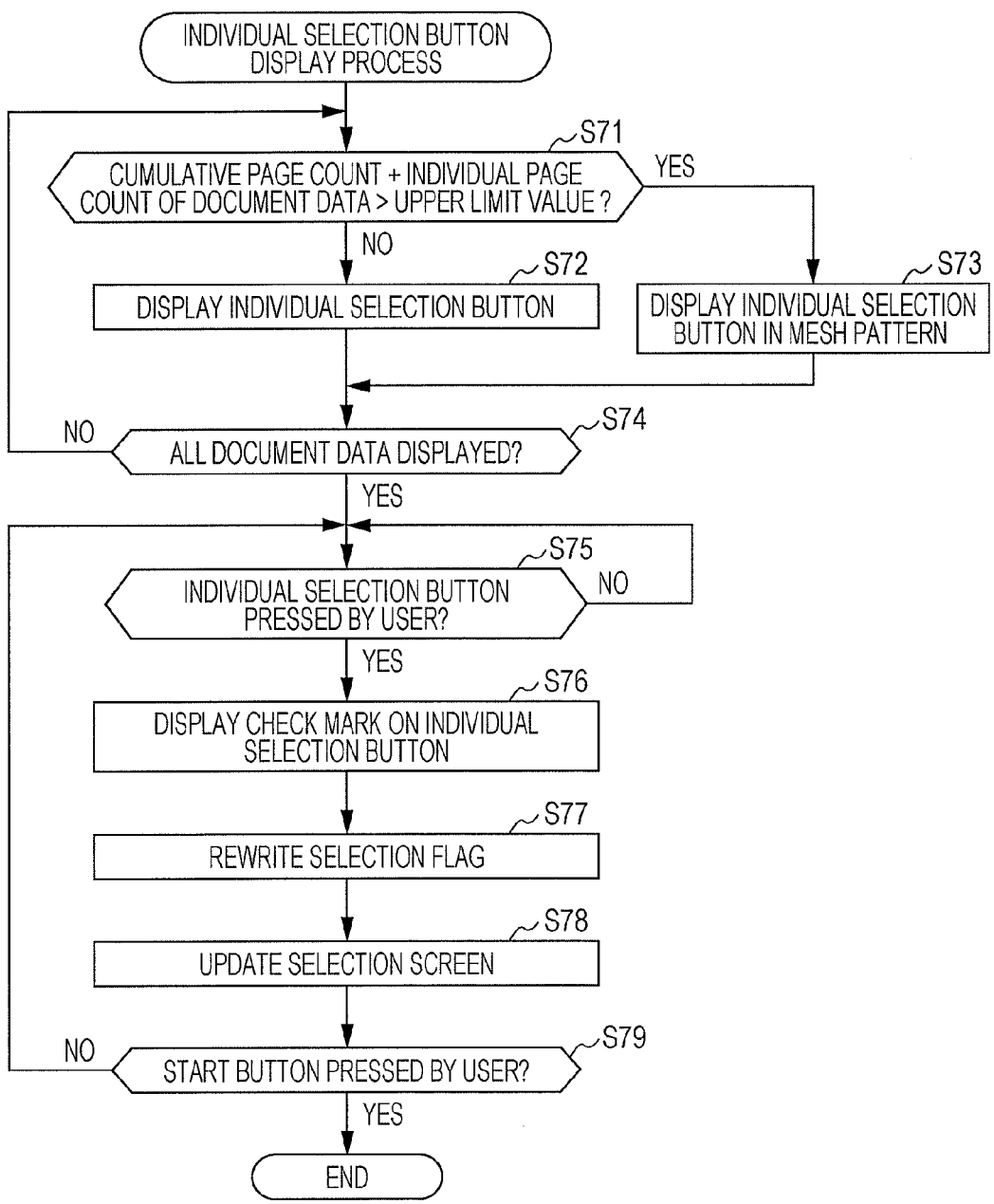
FIG. 12 is a flowchart illustrating an individual selection button display process.

FIG. 12 is a flowchart illustrating the individual selection button display process in step Sa1. In the individual selection button display process, the controller 301 determines whether the sum of the page count of each piece of document data and the cumulative page count is above the upper limit value, and displays a piece of document data causing the sum to be in excess of the upper limit value in a mesh on the selection screen 321 (hereinafter referred to as a mesh pattern). If a piece of document data is displayed in a mesh pattern, the selection of the piece of document data is restricted. The following discussion focuses on a difference between the batch print button display process and the individual selection button display process. In step S71, the controller 301 determines whether the sum of the cumulative page count and the page count of an individual piece of document data included in the table of the user A (hereinafter referred to as an individual page count) is above the upper limit value. The controller 301 reads an individual page count of each piece of document data from the list of the document data stored on the RAM. The controller 301 compares the sum of the cumulative page count of the user A and the individual page count of the one piece of document data with the upper limit value of the user A. If the controller 301 determines that the sum of the cumulative page count and the individual page count is not above the upper limit value (no from step S71), the controller 301 proceeds to step S72. If the controller 301 determines that the sum of the cumulative page count and the individual page count is above the upper limit value (yes from step S71), the controller 301 proceeds to step S73.

In step S72, the controller 301 displays the individual selection button 321B of the one piece of document data on the selection screen 321. The controller 301 stores the number of displayed individual selection buttons 321B on the RAM. In step S73, the controller 301 display the individual selection button 321B of the one piece of document data in a mesh pattern on the selection screen 321. The controller 301 stores the number of selection screens 321 in a mesh pattern on the RAM. In step S74, the controller 301 determines whether all the document data included in the table have been displayed on the selection screen 321. The controller 301 reads the number of displayed individual selection buttons 321B from the RAM, and then determines whether the number of displayed individual selection buttons 321B is equal to the number of pieces of document data in the table of the document data. If the controller 301 determines that all the document data included in the table have been displayed on the selection screen 321 (yes from step S74), the controller 301 proceeds to step S75. If the controller 301 determines that not all the document data included in the table have been displayed on the selection screen 321 (no from step S74), the controller 301 continues performing operations in steps S71 through S73.

Figure 13A:
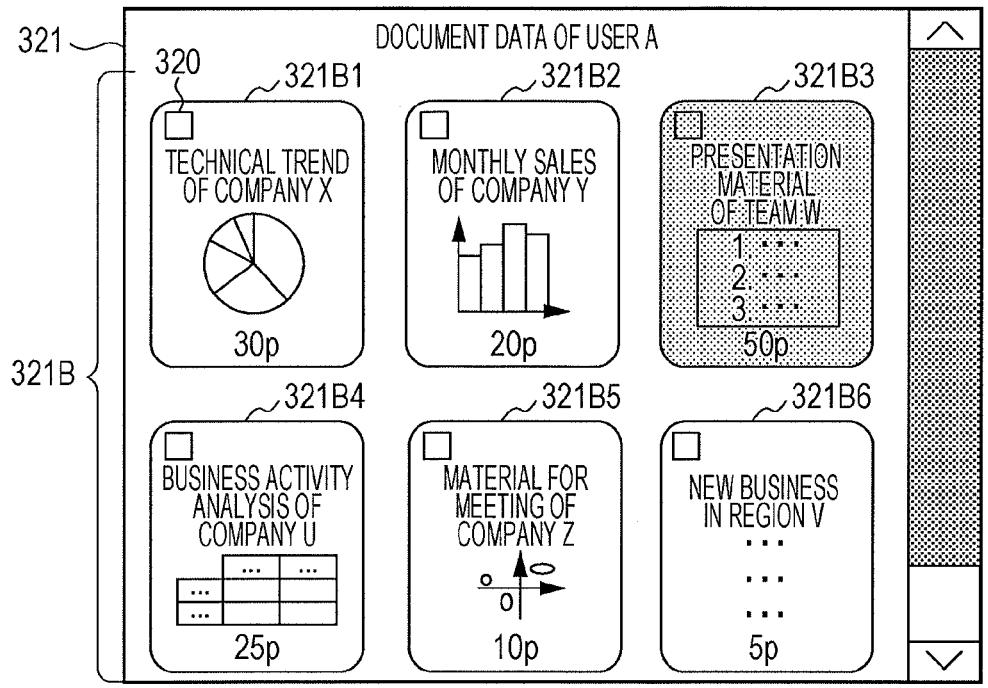
FIGS. 13A and 13B illustrate examples of a selection screen displayed in the individual selection button display process.
Figure 13B:
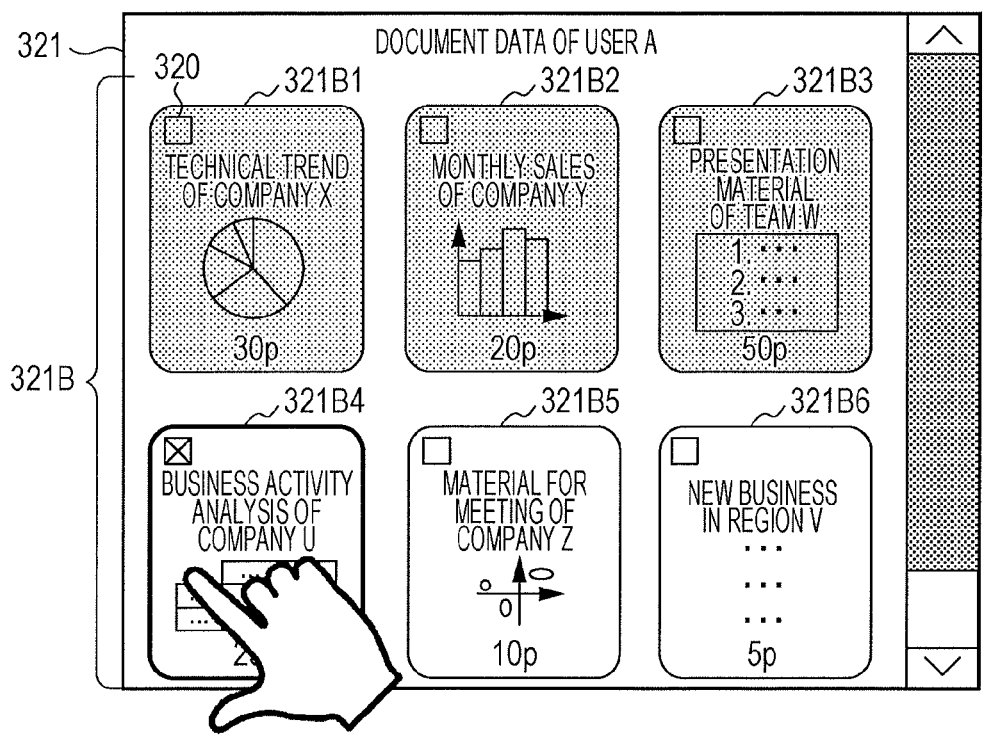

FIGS. 13A and 13B illustrate an example of the selection screen 321 displayed in the individual selection button display process. As illustrated in FIGS. 13A and 13B, the selection screen 321 does not include the batch print button 321A. In FIG. 13A, the individual selection button 321B3 is displayed in a mesh pattern. The mesh pattern denotes that the outputting of the one piece of document data in a mesh pattern is restricted. In the selection screen 321 of FIGS. 13A and 13B, the page count of "PRESENTATION MATERIAL OF TEAM W" is 50 pages. If the cumulative page count of the user A is 960 pages and the upper limit value is 1000 pages (permissible page count is 40 pages), the sum of the cumulative value and the individual page count of 50 pages of "PRESENTATION MATERIAL OF TEAM W" is above the upper limit value (yes from step S71). As illustrated in FIG. 13A, the individual selection button 321B3 is displayed in a mesh pattern (step S73). The output of the "PRESENTATION MATERIAL OF TEAM W" is thus restricted by the upper limit value. The one piece of document data having the output thereof restricted by the upper limit value is displayed in a different manner from the other document data which are not restricted by the upper limit value. As illustrated in FIG. 13A, the user A may select any document data that are output by pressing any of the individual selection buttons 321B1, 321B2, 321B4, 321B5, and 321B6.

Referring back to FIG. 12, the controller 301 determines in step S75 whether the user A has pressed the individual selection button 321B. If the controller 301 determines that the user A has pressed the individual selection button 321B (yes from step S75), the controller 301 proceeds to step S76. If the controller 301 determines that the user A has not pressed the individual selection button 321B (no from step S75), the controller 301 waits on standby until the individual selection button 321B is pressed. The document data selected by the user in step S75 are hereinafter referred to as "selected document data." The document data not selected by the user in step S75 are hereinafter referred to as "unselected document data."

In step S76, the controller 301 display a check mark on the check box 320 of the individual selection button 321B selected by the user. In step S77, the controller 301 rewrites the selection flag corresponding to the selected document data out of the selection flags stored on the RAM with "1." In step S78, the controller 301 updates the selection screen 321 in response to the page count of the selected document data. The controller 301 displays in a mesh pattern the individual selection button 321B of the document data, the outputting of which is newly restricted if the document data become selected to be output. More specifically, the controller 301 determines whether the sum of the cumulative page count, the total page count of the selected document data and the individual page count of the unselected document data is above the upper limit value. The controller 301 calculates the total page count of the selected document data by referencing the RAM and calculating the total page count of the document data having "1" as a selection flag value. The controller 301 retrieves the individual page count of the unselected document data by reading from the RAM the individual page count of the document data having "0" as a selection flag value. The controller 301 compares the sum of the cumulative page count, the total page count of the selected document data, and the individual page count of the unselected document data with the upper limit value of the user A. If the sum of the cumulative page count, the total page count of the selected document data, and the individual page count of the unselected document data is above the upper limit value, the controller 301 displays the individual selection button 321B of the one piece of unselected document data in a mesh pattern.

FIG. 13B illustrates an example of the selection screen 321 subsequent to the updating. FIG. 13B illustrates the case in which the user A has selected "BUSINESS ACTIVITY ANALYSIS OF COMPANY U" in the selection screen 321 of FIG. 13A. If "BUSINESS ACTIVITY ANALYSIS OF COMPANY U" is output, the permissible page count becomes 15 pages. Each of "TECHNICAL TREND OF COMPANY X" having 30 pages, and "MONTHLY SALES OF COMPANY X" having 20 pages exceeds the permissible page count. The individual selection button 321B1 of "TECHNICAL TREND OF COMPANY X," and the individual selection button 321B2 of "MONTHLY SALES OF COMPANY X" are displayed in a mesh pattern. In FIG. 13B, the user may press the individual selection button 321B5 of "MATERIAL FOR MEETING OF COMPANY Z" having 30 pages, or the individual selection button 321B6 of "NEW BUSINESS IN REGION V" having 5 pages to add document data to be output.

The user A may cancel the selection by pressing the already pressed individual selection button 321B in the same manner as in the batch print button display process. In such a case, the check mark and the bold outline are hidden in step S76. In step S77, the controller 301 rewrites with a value "0" the value of the selection flag corresponding to the document data, the selection of which has been canceled, out of the selection flags stored on the RAM. In step S78, the controller 301 causes to be hidden the mesh pattern of the unselected document data which return to an output unlimited state in response to the cancellation of the selection of the document data. For example, if the user A presses the individual selection button 321B3 again in the state of FIG. 13B, the selection screen 321 returns to the state of FIG. 13A. The check mark and the bold outline of the batch print button 321B4 are hidden. The mesh patterns of the individual selection button 321B1 and the individual selection button 321B2 are hidden.

Referring back to FIG. 12, the controller 301 determines whether the user has pressed the start button (not illustrated) of the input unit 305. Upon determining that the user has pressed the start button (yes from step S79), the controller 301 completes the process. Upon determining that the user have not pressed the start button (no from step S79), the controller 301 returns to step S75.

Referring to back to FIG. 7, the controller 301 transmits a transfer request of the output command to the image forming apparatus 20 in step Sa8. The controller 301 transmits the transfer request of the output command of the document data selected by the user. More specifically, the controller 301 references the RAM, and then transmits the transfer request of the output command of the document data having "1" as a selection flag value. The request includes a reception number in the table of the document data.

Upon retrieval of the request from the image forming apparatus 30, the controller 201 reads from the memory 203 the output command of the document data corresponding to the reception number, and then transmits the output command to the image forming apparatus 30. After transmitting the output command, the controller 201 deletes the output command from the memory 203. The controller 201 then generates a table of the document data again in accordance with the remaining output commands stored on the memory 203. The table of the document data thus includes document data that have not been output. The document data that have not been output are not deleted and are included in the table until a predetermined period of time has elapsed since the initialization of the cumulative amount.

In step Sa9, the controller 301 determines whether the output command has been retrieved from the image forming apparatus 20. If the controller 301 determines that the output command has been retrieved (yes from step Sa9), the controller 301 proceeds to step Sa10. If the controller 301 determines that the output command has not been retrieved (no from step Sa9), the controller 301 waits on standby until the output command has been retrieved.

In step Sa10, the controller 301 stores the retrieved output command on the RAM. In step Sa11, the controller 301 executes the output command. The controller 301 reads the output command from the RAM, and outputs the document data included in the output command in an image forming condition represented by a parameter. Upon executing the output command, the controller 301 deletes the output command from the RAM. In step Sa12, the controller 301 updates the cumulative page count. The controller 301 updates the cumulative page count by adding the page count of the document data output in step Sa11 to the cumulative page count stored on the memory 303.

Through the above process, the image forming apparatus 30 displays the selection screen 321 not including the batch print button 321A if the cumulative amount exceeds the threshold value when document data are output in a batch in accordance with the document data included in the table. In this way, it is less likely that the outputting of the document data having a higher priority to the user is suspended in the middle thereof.

The present invention is not limited to the above exemplary embodiment, and a variety of modifications are possible. Modifications of the present invention are described below. Two or more of the modifications may be combined.

(1) First Modification

According to the exemplary embodiment, the controller 301 first determines whether the sum of the cumulative page count and the total page count of the document data is higher than the threshold value. The controller 301 performs the batch print button display process or the individual selection button display process depending on the determination results. Alternatively, the batch print button display process may be performed prior to the determination operation as to whether the sum of the cumulative page count and the total page count of the document data is higher than the threshold value. In such a case, the batch print button display process is performed first. The batch print button 321A is pressed in the batch print button display process, and the controller 301 determines whether the sum of the cumulative page count and the total page count of the document data is higher than the threshold value. If the controller 301 determines that the sum of the cumulative page count and the total page count of the document data is higher than the threshold value, the individual selection button display process is performed.

In the first modification, the selection screen display 32 displays the screen including the batch selection screen. If the document data are selected in a batch on the batch selection screen, the selection screen display 32 displays the individual selection screen if the cumulative amount is above the threshold value when the image forming unit 35 forms images in accordance with the selected document data.

Figure 14:
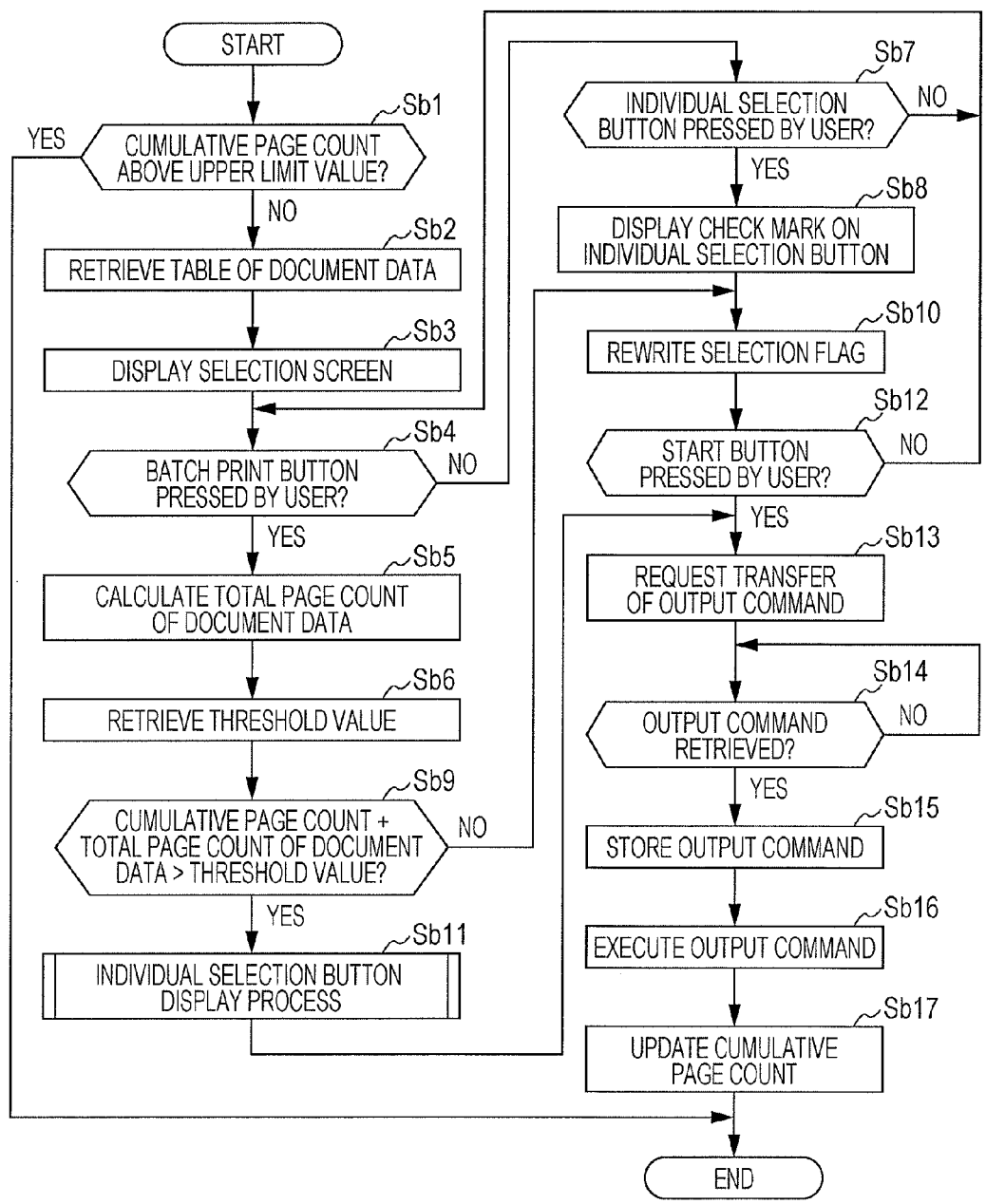
FIG. 14 is a flowchart illustrating a process of an image forming apparatus of a first modification of the exemplary embodiment.

FIG. 14 is a flowchart illustrating a process of the image forming apparatus 30 of the first modification. The following discussion focuses on a difference between the process of the exemplary embodiment and the process of the first modification. In steps Sb1 and Sb2, the controller 301 performs operations corresponding to steps Sa1 and Sa2 of FIG. 7, respectively. In step Sb3, the controller 301 displays the selection screen. The controller 301 displays the selection screen 321 of FIG. 11 on the display 304. In step Sb4, the controller 301 determines whether the user A has pressed the batch print button 321A. If the controller 301 determines that the user A has pressed the batch print button 321A (yes from step Sb4), the controller 301 proceeds to step Sb5. If the controller 301 determines that the user A has not pressed the batch print button 321A (no from step Sb4), the controller 301 proceeds to step Sb7.

In steps Sb5 and Sb6, the controller 301 performs operations in steps Sa3 and Sa4 of FIG. 7, respectively. In step Sb7, the controller 301 determines whether the user A has pressed the individual selection button 321B. If the controller 301 determines that the user A has pressed the individual selection button 321B (yes from step Sb7), the controller 301 proceeds to step Sb8. If the controller 301 determines that the user A has not pressed the individual selection button 321B (no from step Sb7), the controller 301 returns to step Sb4.

In step Sb8, the controller 301 performs an operation corresponding to step S64 of FIG. 10. In step Sb9, the controller 301 determines whether the sum of the cumulative page count and the total page count of the document data of the user A is higher than the threshold value. If the controller 301 determines that the sum of the cumulative page count and the total page count of the document data of the user A is equal to or lower than the threshold value (no from step Sb9), the controller 301 proceeds to step Sb10. If the controller 301 determines that the sum of the cumulative page count of the user A and the total page count of the document data is higher than the threshold value (yes from step Sb9), the controller 301 proceeds to step Sb11.

In step Sb10, the controller 301 performs an operation corresponding to step S65 of FIG. 10. In step Sb11, the controller 301 performs the individual selection button display process of FIG. 12. In step Sb12, the controller 301 determines whether the user has pressed the start button of the input unit 305. If the controller 301 determines that the user has pressed the start button of the input unit 305 (yes from step Sb12), the controller 301 proceeds to step Sb13. If the controller 301 determines that the user has not pressed the start button of the input unit 305 (no from step Sb12), the controller 301 returns to step Sb4. In steps Sb13 through Sb17, the controller 301 performs operations corresponding to steps Sa8 through Sa12 of FIG. 7, respectively.

(2) Second Modification

The selection method of the document data to be output is not limited to the selection method of the exemplary embodiment. The user may specify document data not to be output by pressing the individual selection button 321B. In such a case, the remaining document data not specified are output. The check mark is displayed beforehand on the check box 320, and the check mark is set to be hidden in step S64 or S76.

(3) Third Modification

The one piece of document data having the output thereof restricted by the upper limit value is displayed in the mesh pattern on the selection screen 321 in the individual selection button display process to discriminate the one piece of document data from the remaining document data having the output thereof not restricted by the upper limit value. The discrimination method is not limited the mesh pattern. For example, the document data having the output thereof restricted by the upper limit value may be displayed in a different color or a different shape from the individual selection button 321B of the remaining data having the output thereof restricted by the upper limit value. In yet another example, the one piece of document data having the output thereof restricted by the upper limit value may not be displayed at all on the selection screen 321. In such a case, the one piece of document data may not be selected by the user.

(4) Fourth Modification

The criteria according to which the individual selection buttons 321B are arranged on the selection screen 321 are not limited to the command time and date. The controller 301 may arrange the individual selection buttons 321B according to the file names of the document data. In another example, the controller 301 may arrange the individual selection buttons 321B according to the page counts of the document data. In yet another example, the controller 301 may arrange the individual selection buttons 321B according to plural pieces of information included in the table of the document data. For example, the individual selection buttons 321B may be arranged according to the command time and date serving as a first criterion and the page counts of the document data serving as a second criterion.

Figure 15A:
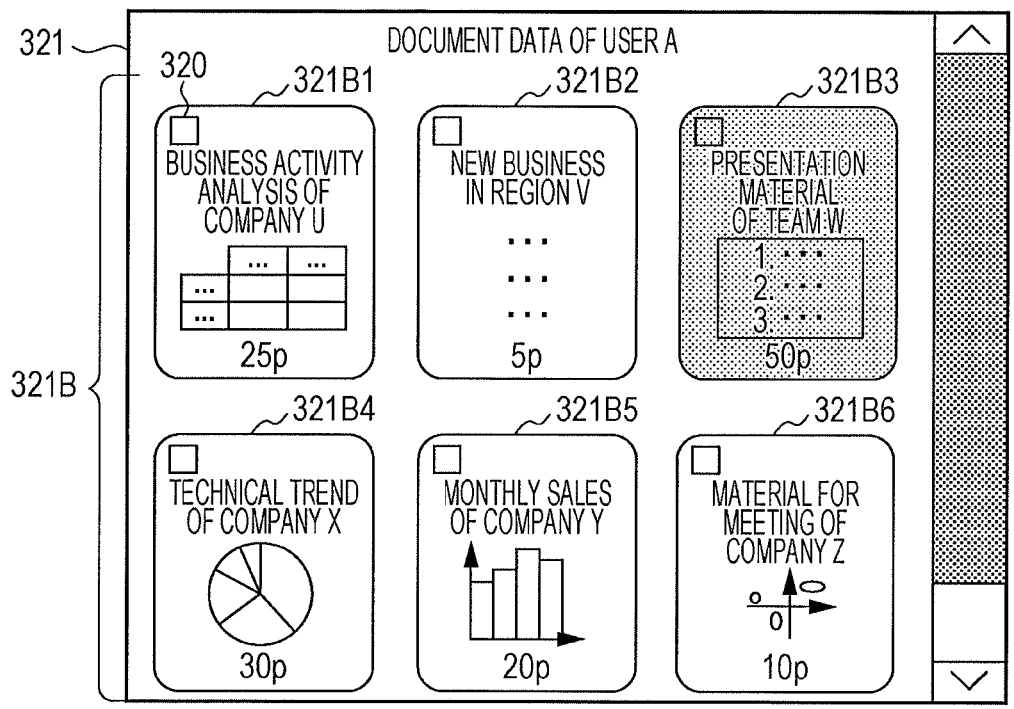
FIGS. 15A and 15B illustrate examples of selection screen of a fourth modification of the exemplary embodiment.
Figure 15B:
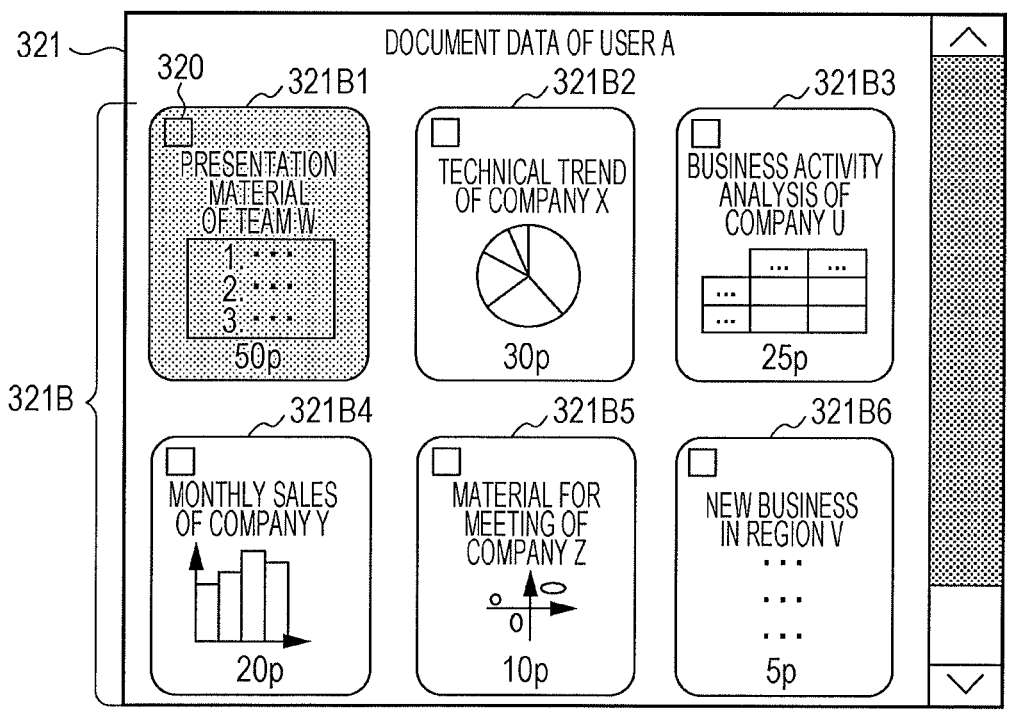

FIGS. 15A and 15B illustrate an example of the selection screen 321 of a fourth modification. FIG. 15A illustrates the individual selection buttons 321B that are arranged according to the file name. As illustrated in FIG. 15A, the individual selection buttons 321B are arranged in alphabetical order of the names of the companies. FIG. 15B illustrates the individual selection buttons 321B that are arranged according to the page count. As illustrated in FIG. 15B, the individual selection buttons 321B are arranged in the order of high to low page count.

(5) Fifth Modification

The display method of the selection screen 321 is not limited to the display method of the exemplary embodiment. For example, the batch print button 321A in a mesh pattern may be included in the selection screen 321 in the individual selection button display process. The batch print button 321A in the mesh pattern indicates that the outputting of the document data may be suspended in the middle of the outputting if the outputting of the document data in a batch is specified. In another example, the individual selection button 321B may not be displayed in the selection screen 321 in the batch print button display process. In such a case, steps S63 and S64 of FIG. 10 are omitted. If the controller 301 determines in step S62 that the user A has not pressed the batch print button 321A (no from step S62), the controller 301 waits on standby until the batch print button 321A has been pressed.

The method of discriminating the individual selection button 321B pressed by the user from the individual selection button 321B unpressed by the user is not limited to the display of the check mark on the check box 320. For example, the individual selection button 321B pressed by the user and the individual selection button 321B unpressed by the user may be discriminated by displaying the individual selection buttons 321B pressed and unpressed by the user in different colors or shapes.

In yet another example, a permissible page count may be displayed on the selection screen 321.

(6) Sixth Modification

The processes of the exemplary embodiment are not limited to those depicted in the flowcharts. For example, if the controller 301 determines in the individual selection button display process that the user has pressed the batch print button 321A (yes from step S62), the user action of pressing the start button (step S66) may be skipped.

In another example, the method of discriminating the document data selected by the user from the document data unselected by the user on the selection screen is not limited to using the selection flag. The controller 301 may store a list of document data selected by the user on the selection screen onto the RAM.

In yet another example, the image forming apparatus 20 as the master apparatus may store one of the cumulative page count, the upper limit value, and the threshold value. In such a case, the controller 301 retrieves the cumulative page count, the upper limit value, and the threshold of the user A value from the image forming apparatus 20 in step Sa1 or Sa4.

(7) Seventh Modification

In the exemplary embodiment, the single mater station, the single dependent apparatus, and the single terminal apparatus form the image forming system 1 for simplicity of explanation. The number of apparatuses of each type forming the image forming system 1 is not limited to one. For example, the image forming system 1 may includes plural mater stations, plural dependent apparatuses, and plural terminal apparatuses. A single image forming apparatus may be set up to serve as both the master apparatus and the dependent apparatus. In such a case, the single image forming apparatus, when serving as the master apparatus, transmits an output command to another image forming apparatus. The single image forming apparatus, when serving as the dependent apparatus, retrieves an output command from another image forming apparatus, and executes the output command.

(8) Eighth Modification

The outputting of the image is not limited to the function of the image forming apparatus 30. The outputting of the image may be performed on the image forming apparatus 20. In such a case, the process of FIG. 7 may be performed on the image forming apparatus 20. If the image forming apparatus 20 outputs the image, operations in steps Sa8 through Sa10 are skipped. In step Sa11, the controller 201 reads from the memory 203 the output command related to the document data having "1" as a selection flag value, and then executes the output command.

(9) Ninth Modification

A retrieval source from which the image forming apparatus 20 retrieves the document data is not limited to the terminal apparatus 10. The image forming apparatus 20 may retrieve the document data from a server apparatus, for example. In another example, the image forming apparatus 20 may store the document data on the memory 203.

(10) Tenth Modification

The control programs executed by the terminal apparatus 10, the image forming apparatus 20, and the image forming apparatus 30 in the exemplary embodiment may be supplied in a stored state on computer readable recording media. The computer readable recording media include magnetic recording media (magnetic tape, magnetic disks, such as hard disk drive (HDD), and floppy disk (flexible disk)), optical recording media (optical disks, such as compact disk (CD), and digital versatile disk (DVD)), magneto-optical disk, and semiconductor memory (flash DVD). The control programs may be downloaded via a network including the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a first retrieval unit configured to retrieve a table of document data;
an image forming unit configured to form an image on a recording medium in accordance with the document data;
a second retrieval unit configured to retrieve a cumulative amount of images formed by the image forming unit;
a third retrieval unit configured to retrieve a threshold value of the cumulative amount of images to be formed by the image forming unit; and
a display configured to display a selection screen that allows a user to select document data forming an image from the document data included in the table,
wherein in response to the cumulative amount not exceeding the threshold value when the image forming unit forms images in accordance with the document data included in the table, the display displays a screen including a batch selection screen that allows the document data included in the table to be selected in batch and an individual selection screen that allows the document data included in the table to be selected individually, and
in response to the cumulative amount exceeding the threshold value when the image forming unit forms the images in accordance with the document data included in the table, the display displays an individual selection and disables designation of the batch selection screen.

2. The image forming apparatus according to claim 1, wherein the individual selection screen comprises a user interface that permits the user to select document data forming an image in order to specify the document data forming the image.

3. The image forming apparatus according to claim 2, wherein the user interface comprises a contracted image of the image of the document data.

4. The image forming apparatus according to claim 1, wherein the individual selection screen comprises a user interface that permits the user to select document data forming an image in order to specify document data not forming the image.

5. The image forming apparatus according to claim 1, wherein in response to the cumulative amount exceeding the threshold value when the image forming unit forms an image in accordance with a piece of the document data included in the table, the display displays the piece of the document data on the individual selection screen in a different manner from the remaining pieces of the document data.

6. The image forming apparatus according to claim 1, wherein in response to the cumulative amount exceeding the threshold value when the image forming unit forms an image in accordance with a piece of the document data included in the table, the display displays the individual selection screen so that the piece of the document data is not selectable by the user.

7. The image forming apparatus according to claim 6, wherein the display does not display the piece of the document data on the individual selection screen so that the piece of the document data is not selectable by the user.

8. The image forming apparatus according to claim 1, wherein the cumulative amount has an upper limit value; and
wherein the threshold value is equal to or lower than the upper limit value.

9. The image forming apparatus according to claim 1, wherein the document data comprise information representing time and date; and
wherein the display is configured to display, on the individual selection screen, the document data arranged with reference to the information representing time and date.

10. The image forming apparatus according to claim 1, wherein the document data comprise a file name; and
wherein the display is configured to display, on the individual selection screen, the document data arranged with reference to the file name.

11. The image forming apparatus according to claim 1, wherein the document data comprise information representing a page count of a formed image; and
wherein the display is configured to display, on the individual selection screen, the document data arranged with reference to the page count.

12. The image forming apparatus according to claim 1, wherein the cumulative amount is initialized at a timing responsive to a predetermined event; and wherein document data with an image thereof not formed by the information forming unit remains included in the table of the document data until a preset period of time has elapsed since the timing.

13. The image forming apparatus according to claim 1, wherein in response to a sum of i) the cumulative amount of images to be formed by the image forming unit and ii) a page count of document data for one document included in the table being greater than an upper limit value, the image forming apparatus accentuates the one document in the individual selection screen.

14. An image forming apparatus comprising:
a first retrieval unit configured to retrieve a table of document data;
an image forming unit configured to form an image on a recording medium in accordance with the document data;
a second retrieval unit configured to retrieve a cumulative amount of images formed by the image forming unit;
a third retrieval unit configured to retrieve a threshold value of the cumulative amount of images to be formed by the image forming unit; and
a display configured to display a selection screen that allows a user to select document data forming an image from the document data included in the table, to display a screen including a batch selection screen that allows the document data included in the table to be selected in a batch, and to display an individual selection screen that allows the document data included in the table to be selected individually,
wherein in response to the document data being selected in a batch on the batch selection screen, and the cumulative amount exceeding the threshold value when the image forming unit forms images in accordance with the selected document data, the display displays the individual selection screen and disables designation of the batch selection screen.

15. The image forming apparatus according to claim 14, wherein the individual selection screen comprises a user interface that permits the user to select document data forming an image in order to specify the document data forming the image.

16. An image forming method comprising:
retrieving a table of document data;
forming an image on a recording medium in accordance with the document data;
retrieving a cumulative amount of formed images;
retrieving a threshold value of the cumulative amount of images to be formed; and
displaying a selection screen that allows a user to select document data forming an image from the document data included in the table,
wherein in response to the cumulative amount not exceeding the threshold value when images are formed in accordance with the document data included in the table, the displaying includes displaying a screen including a batch selection screen that allows the document data included in the table to be selected in a batch and an individual selection screen that allows the document data included in the table to be selected individually, and
in response to the cumulative amount exceeding the threshold value when the images are formed in accordance with the document data included in the table, the displaying includes displaying an individual selection screen and disables designation of the batch selection screen.

17. An image forming method comprising:
retrieving a table of document data;
forming an image on a recording medium in accordance with the document data;
retrieving a cumulative amount of formed images;
retrieving a threshold value of the cumulative amount of images formed; and
displaying a selection screen that allows a user to select document data forming an image from the document data included in the table, and displaying a screen including a batch selection screen that allows the document data included in the table to be selected in a batch and an individual selection screen that allows the document data included in the table to be selected individually,
wherein in response to the document data being selected in a batch on the batch selection screen, and the cumulative amount exceeding the threshold value when the images are formed in accordance with the selected document data, the displaying includes displaying the individual selection screen and disabling designation of the batch selection screen.

18. An image forming system, comprising a first image forming apparatus and a second image forming apparatus;
wherein the first image forming apparatus is configured to transmit a table of document data; and
wherein the second image forming apparatus includes:
a first retrieval unit configured to retrieve the table of the document data from the first image forming apparatus;
an image forming unit configured to form an image on a recording medium in accordance with the document data;
a second retrieval unit configured to retrieve a cumulative amount of images formed by the image forming unit;
a third retrieval unit configured to retrieve a threshold value of the cumulative amount of images to be formed by the image forming unit; and
a display configured to display a selection screen that allows a user to select document data forming an image from the document data included in the table,
wherein in response to the cumulative amount not exceeding the threshold value when the image forming unit forms images in accordance with the document data included in the table, the display displays a screen including a batch selection screen that allows the document data included in the table to be selected in a batch and an individual selection screen that allows the document data included in the table to be selected individually, and
in response to the cumulative amount exceeding the threshold value when the image forming unit forms the images in accordance with the document data included in the table, the display displays the individual selection screen and disables designation of the batch selection screen.

19. An image forming system, comprising a first image forming apparatus and a second image forming apparatus;
wherein the first image forming apparatus is configured to transmit a table of document data; and
wherein the second image forming apparatus includes:
a first retrieval unit configured to retrieve a table of document data from the first image forming apparatus;
an image forming unit configured to form an image on a recording medium in accordance with the document data;

a second retrieval unit configured to retrieve a cumulative amount of images formed by the image forming unit;

a third retrieval unit configured to retrieve a threshold value of the cumulative amount of images to be formed by the image forming unit; and a display configured to display a selection screen that allows a user to select document data forming an image from the document data included in the table, and displays a screen including a batch selection screen that allows the document data included in the table to be selected in a batch and an individual selection screen that allows the document data included in the table to be selected individually, and wherein in response to the document data being selected in a batch on the batch selection screen, and the cumulative amount exceeding the threshold value when the image forming unit forms images in accordance with the selected document data, the display displays the individual selection screen and disables designation of the batch selection screen.

20. A non-transitory computer readable medium storing a program causing a computer to execute a process for forming an image, the process comprising:

retrieving a table of document data;

forming an image on a recording medium in accordance with the document data;

retrieving a cumulative amount of formed images;

retrieving a threshold value of the cumulative amount of images to be formed; and displaying a selection screen that allows a user to select document data forming an image from the document data included in the table, wherein in response to the cumulative amount not exceeding the threshold value when images are formed in accordance with the document data included in the table, the displaying includes displaying a screen including a batch selection screen that allows the document data included in the table to be selected in a batch and an individual selection screen that allows the document data included in the table to be selected individually, and in response to the cumulative amount exceeding the threshold value when the images are formed in accordance with the document data included in the table, the displaying includes displaying the individual selection screen and disabling designation of the batch selection screen.

21. A non-transitory computer readable medium storing a program causing a computer to execute a process for forming an image, the process comprising:

retrieving a table of document data;

forming an image on a recording medium in accordance with the document data;

retrieving a cumulative amount of formed images;

retrieving a threshold value of the cumulative amount of images to be formed; and displaying a selection screen that allows a user to select document data forming an image from the document data included in the table, and displaying a screen including a batch selection screen that allows the document data included in the table to be selected in a batch and an individual selection screen that allows the document data included in the table to be selected individually, wherein in response to the document data being selected in a batch on the batch selection screen, and the cumulative amount exceeding the threshold value when the images are formed in accordance with the selected document data, the displaying includes displaying the individual selection screen and disabling designation of the batch selection screen.

* * * * *